US012776076B2

(12) United States Patent
Lozada et al.

(10) Patent No.: US 12,776,076 B2
(45) Date of Patent: Oct. 27, 2026

(54) DISTRIBUTED CONTENT RENDERING

(71) Applicant: Apple Inc., Cupertino, CA (US)

(72) Inventors: Richard P. Lozada, Cupertino, CA (US); Thomas G. Salter, Foster City, CA (US)

(73) Assignee: Apple Inc., Cupertino, CA (US)

( * ) Notice: Subject to any disclaimer, the term of this patent is extended or adjusted under 35 U.S.C. 154(b) by 250 days.

(21) Appl. No.: 18/280,432

(22) PCT Filed: Feb. 25, 2022

(86) PCT No.: PCT/US2022/018000
§ 371 (c)(1),
(2) Date: Sep. 5, 2023

(87) PCT Pub. No.: WO2022/192011
PCT Pub. Date: Sep. 15, 2022

(65) Prior Publication Data
US 2024/0070931 A1 Feb. 29, 2024

Related U.S. Application Data

(60) Provisional application No. 63/159,702, filed on Mar. 11, 2021.

(51) Int. Cl.
*G06T 11/00* (2026.01)
*G06F 3/01* (2006.01)
(Continued)

(52) U.S. Cl.
CPC .............. *G06T 11/00* (2013.01); *G06F 3/017* (2013.01); *G06T 3/02* (2024.01); *G06T 3/40* (2013.01);
(Continued)

(58) Field of Classification Search
CPC ... G06T 11/00; G06T 3/02; G06T 3/40; G06T 7/70; G06T 15/00; G06T 2210/08;
(Continued)

(56) References Cited

U.S. PATENT DOCUMENTS 5,475,803 A * 12/1995 Stearns ..................... G06T 3/00 345/648
2009/0037724 A1* 2/2009 Carion .................... G06F 9/452 713/100
(Continued)

FOREIGN PATENT DOCUMENTS

CN 107767466 A * 3/2018 ......... G06F 3/04815

OTHER PUBLICATIONS

Lassner, Christoph, Gerard Pons-Moll, and Peter V. Gehler. "A generative model of people in clothing." Proceedings of the IEEE international conference on computer vision. 2017. (Year: 2017).*
(Continued)

*Primary Examiner* — Daniel F Hajnik
*Assistant Examiner* — Chris Alejandro Puntier
(74) *Attorney, Agent, or Firm* — Fernando & Partners, LLP

(57) ABSTRACT

In one implementation, a method of distributed content rendering is performed at a first device including a display, one or more processors, and non-transitory memory. The method includes determining a pose of a virtual object in a volumetric environment. The method includes generating a request for content rendering instructions based on the pose of the virtual object. The method includes sending, to a second device, the request for the content rendering instructions. The method includes receiving, from the second device, the content rendering instructions. The method includes displaying, based on the content rendering instructions, a content rendering on the virtual object.

19 Claims, 16 Drawing Sheets

(51) Int. Cl.
*G06T 3/02* (2024.01)
*G06T 3/40* (2006.01)
*G06T 7/70* (2017.01)
*G06T 15/00* (2011.01)

(52) U.S. Cl.
CPC ................ *G06T 7/70* (2017.01); *G06T 15/00* (2013.01); *G06T 2210/08* (2013.01)

(58) Field of Classification Search
CPC .... G06F 3/017; G09G 2340/04; G09G 5/373; G09G 5/391; G09G 5/38
See application file for complete search history.

(56) References Cited

U.S. PATENT DOCUMENTS

| | | | | |
|---|---|---|---|---|
| 2011/0210982 | A1* | 9/2011 | Sylvan | G06F 9/5038 345/629 |
| 2013/0227418 | A1* | 8/2013 | Sa | G06F 3/017 715/728 |
| 2015/0301586 | A1* | 10/2015 | Murakami | G06F 1/3243 345/502 |
| 2017/0024182 | A1* | 1/2017 | Yamat | G06F 3/1454 |
| 2017/0168296 | A1 | 6/2017 | Giwnewer et al. | |
| 2019/0080499 | A1* | 3/2019 | Holzer | H04N 13/111 |
| 2019/0391662 | A1* | 12/2019 | Yokokawa | A63F 13/25 |
| 2020/0302698 | A1 | 9/2020 | Boissiere et al. | |
| 2020/0401804 | A1 | 12/2020 | Grundhoefer et al. | |
| 2021/0183149 | A1* | 6/2021 | Araújo | G06T 19/006 |
| 2021/0225075 | A1* | 7/2021 | Szilagyi | G06T 15/06 |
| 2021/0314520 | A1* | 10/2021 | Yu | H04N 21/4438 |

OTHER PUBLICATIONS

PCT International Search Report and Written Opinion dated Jun. 20, 2022, PCT International Application No. PCT/US22/18000, pp. 1-11.

* cited by examiner

DISTRIBUTED CONTENT RENDERING

CROSS-REFERENCE TO RELATED APPLICATIONS

This application is the national phase entry of Intl. Patent App. No. PCT/US2022/018000, filed on Feb. 25, 2022, which claims priority to U.S. Provisional Patent App. No. 63/159,702, filed on Mar. 11, 2021, which is are both hereby incorporated by reference in their entireties.

TECHNICAL FIELD

The present disclosure generally relates to systems, methods, and devices for displaying, on a first device, content rendered by a second device.

BACKGROUND

In various implementations, a first device generates content to be rendered on a second device. It may be desirable to reduce the bandwidth used in transmitting the content from the first device to the second device.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
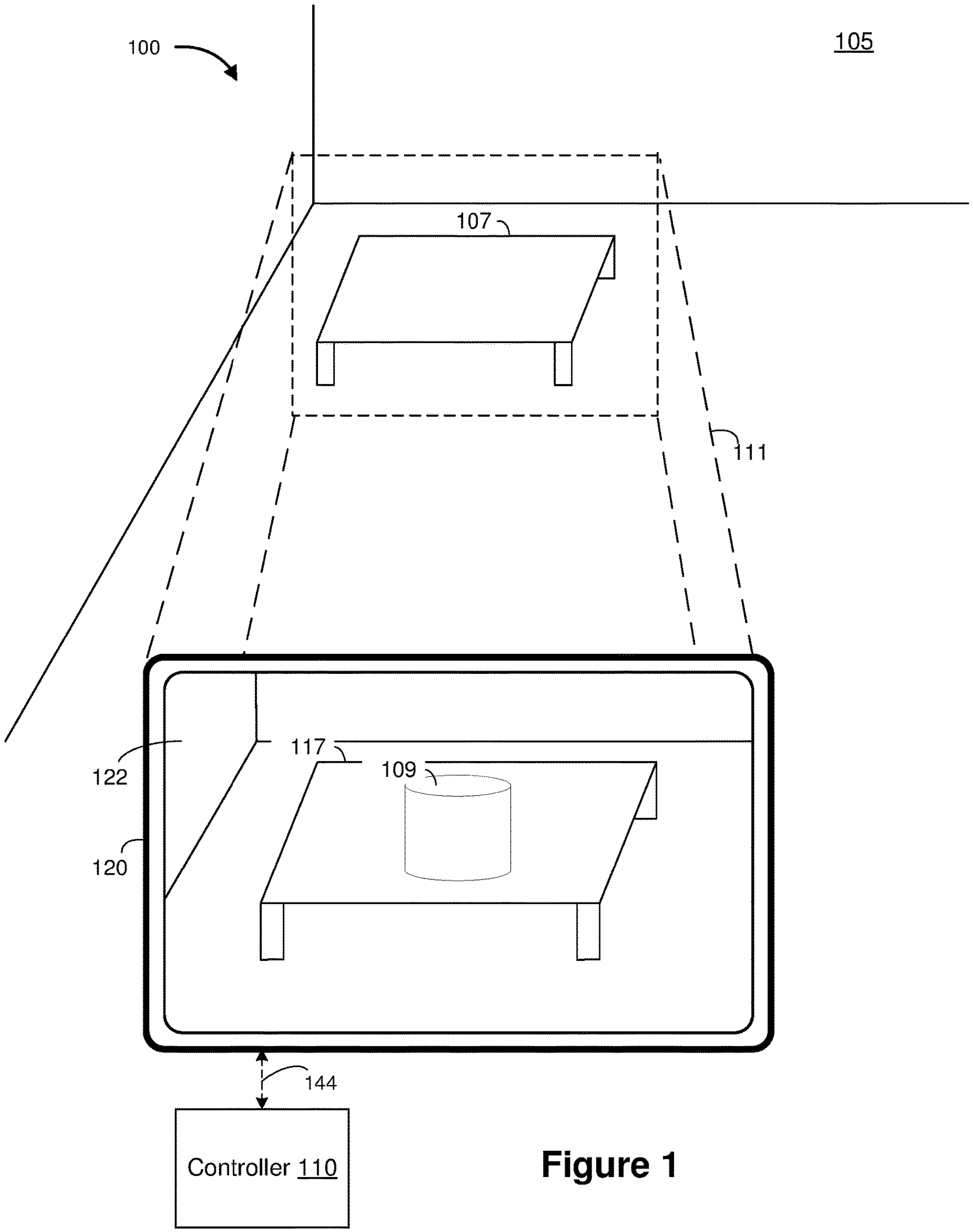
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for distributed content rendering. In various implementations, the method is performed by a first device including a display, one or more processors, and non-transitory memory. The method includes determining a pose of a virtual object in a volumetric environment. The method includes generating a request for content rendering instructions based on the pose of the virtual object. The method includes sending, to a second device, the request for the content rendering instructions. The method includes receiving, from the second device, the content rendering instructions. The method includes displaying, based on the content rendering instructions, a content rendering on the virtual object.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

In various implementations, a first device generates content to be rendered on a second device. For example, in various implementations, the first device transmits, to the second device, content rendering instructions interpretable by the second device to generate a content rendering. In various implementations, the content rendering instructions include an image or video stream that the second device renders on a virtual object, such as a virtual picture frame or virtual television. To advantageously reduce the amount of bandwidth in transmitting the content rendering instructions from the first device to the second device, the first device generates the content rendering instructions based on a pose of the virtual object. For example, when the user is close to the virtual picture frame and the image will be rendered by the second device at a first size, the image transmitted by the first device has a first resolution. When the user is far from the virtual picture frame and the image will be rendered by the second device at a second size smaller than the first size, the image transmitted by the first device has a second resolution lower than the first resolution. As another example, when the virtual picture frame is at first angle to the user (e.g., facing the user) and the image will be rendered by the second device with a first width, the image transmitted by the first device has a first horizontal resolution. When the virtual picture frame is at a second angle to the user (e.g., rotated about a vertical axis of the virtual picture frame such that the virtual picture frame is partially turned away from the user) and the image will be rendered by the second device with a second width less than the first width, the image transmitted by the first device has a second horizontal resolution lower than the first horizontal resolution.

Further, in various implementations, the content rendering instructions include graphic commands. For example, rather than transmit an image of a text field populated with particular text, the content rendering instructions include the particular text and a graphic command to render a text field populated with the particular text.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
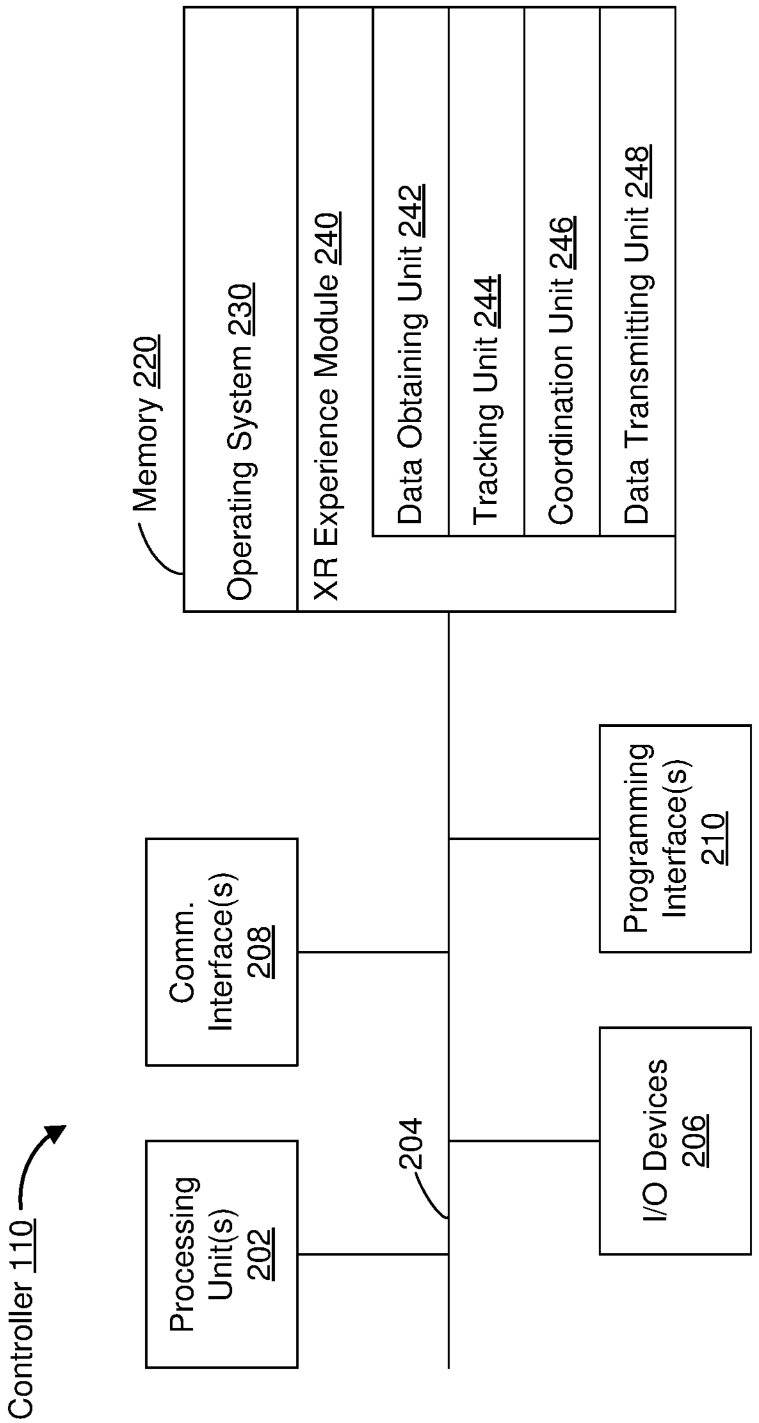
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
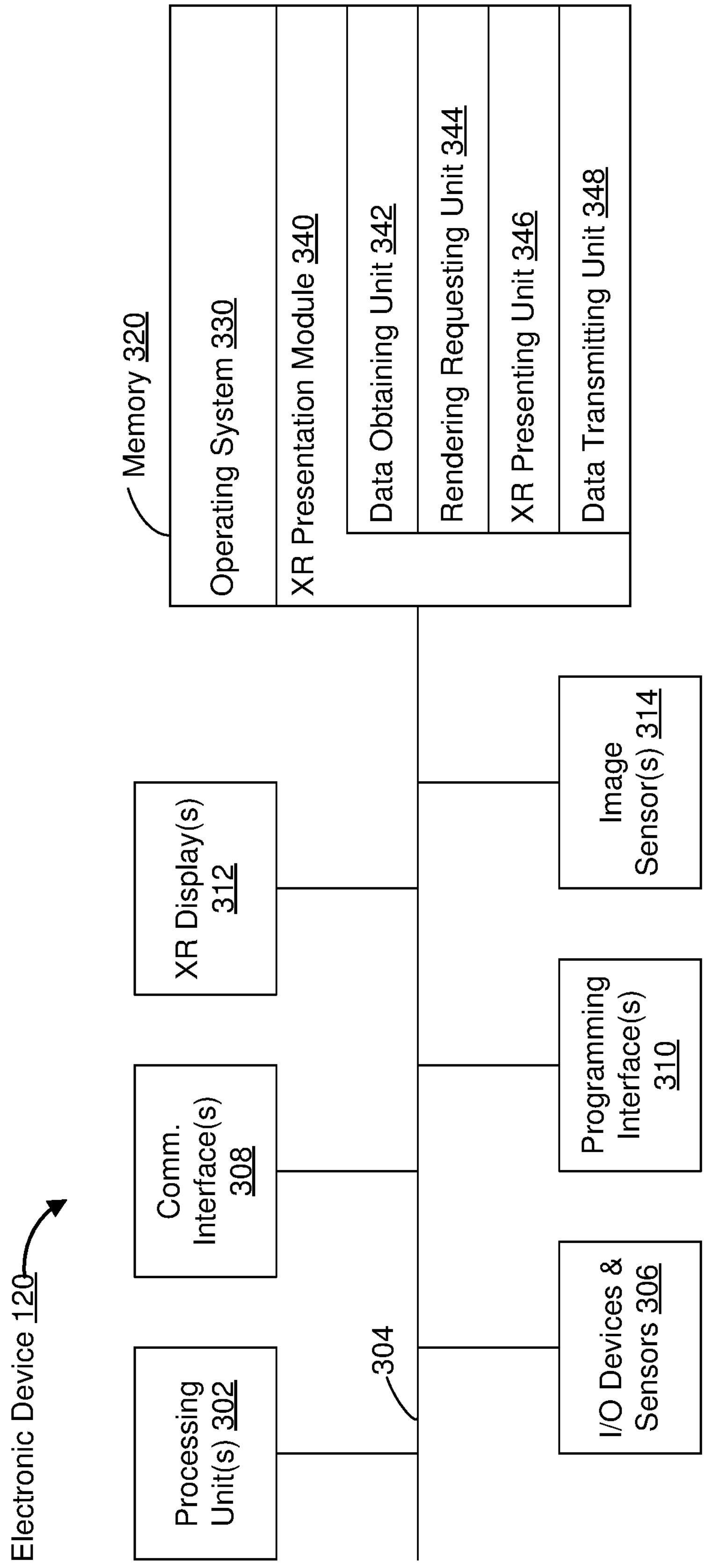
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, a rendering requesting unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the rendering requesting unit 344 is configured to generate a request for content rendering instructions based on a pose of a virtual object. To that end, in various implementations, the rendering requesting unit 344 includes instructions and/or logic therefor, and heuristics and metadata therefor.

In some implementations, the XR presenting unit 346 is configured to present XR content via the one or more XR displays 312, such as the content rendering on the virtual object. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. In some implementations, the data transmitting unit 348 is configured to transmit the request for a content rendering. To that end, in various implementations, the data transmitting unit 348 includes instructions and/or logic therefor, and heuristics and metadata therefor.

Although the data obtaining unit 342, the rendering requesting unit 344, the XR presenting unit 346, and the data transmitting unit 348 are shown as residing on a single device (e.g., the electronic device 120), it should be understood that in other implementations, any combination of the data obtaining unit 342, the rendering requesting unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIGS. 4A-4L illustrate an XR environment 400 during a series of time periods. In various implementations, each time period is an instant, a fraction of a second, a few a few seconds, a few hours, a few days, or any length of time.

The XR environment 400 includes a plurality of objects, including one or more real objects (e.g., a wall 411, a picture 412, a table 413, and a phone 414) and one or more virtual objects (e.g., a virtual clock 421 and a virtual cylinder 422). In various implementations, certain objects (such as the real objects 411, 412, 413, and 414 and the virtual cylinder 422) are displayed at a location in the XR environment 400, e.g., at a location defined by three coordinates in a three-dimensional (3D) XR coordinate system. Accordingly, when the electronic device moves in the XR environment 400 (e.g., changes position and/or orientation), the objects are moved on the display of the electronic device, but retain their location in the XR environment 400. Such virtual objects that, in response to motion of the electronic device, move on the display, but retain their position in the XR environment 400 are referred to as world-locked objects. In various implementations, certain virtual objects (such as the virtual clock 421) are displayed at locations on the display such that when the electronic device moves in the XR environment

400, the objects are stationary on the display on the electronic device. Such virtual objects that, in response to motion of the electronic device, retain their location on the display are referred to as head-locked objects or display-locked objects.

Figure 4A:
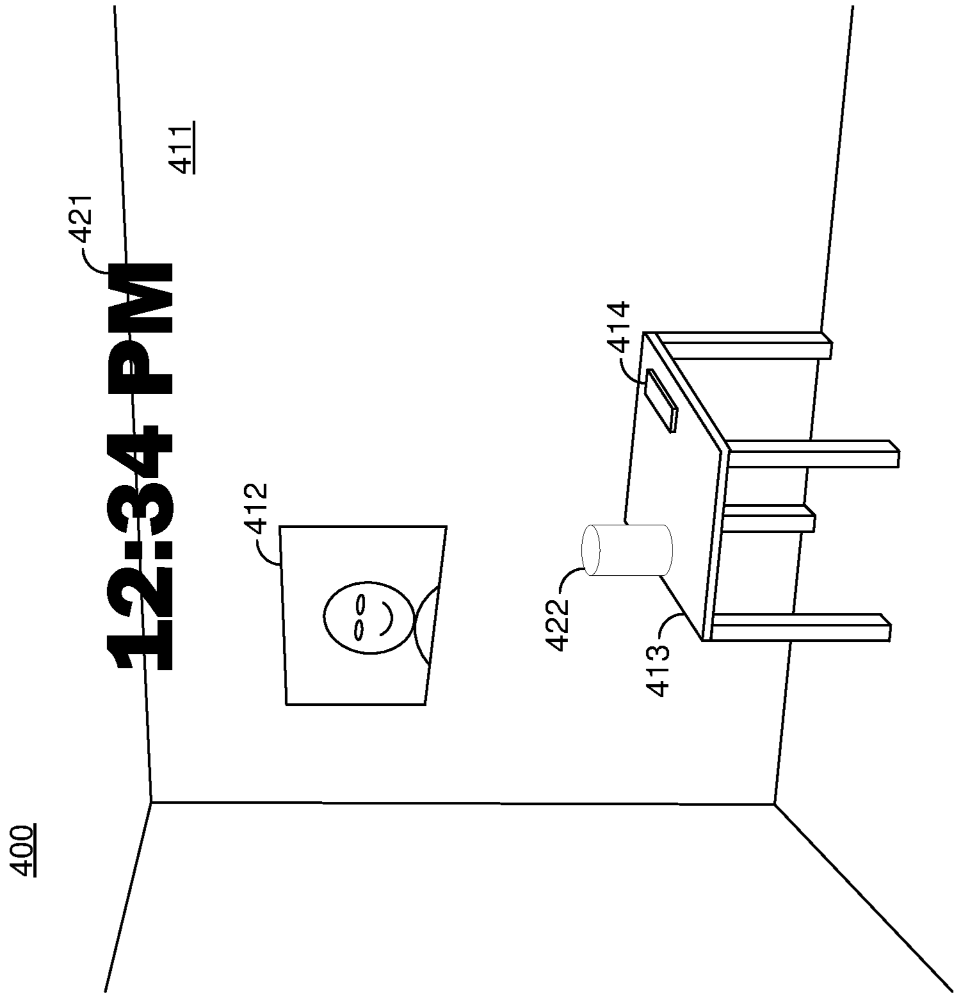
FIGS. 4A-4L illustrates an XR environment during various time periods in accordance with some implementations.
Figure 4B:
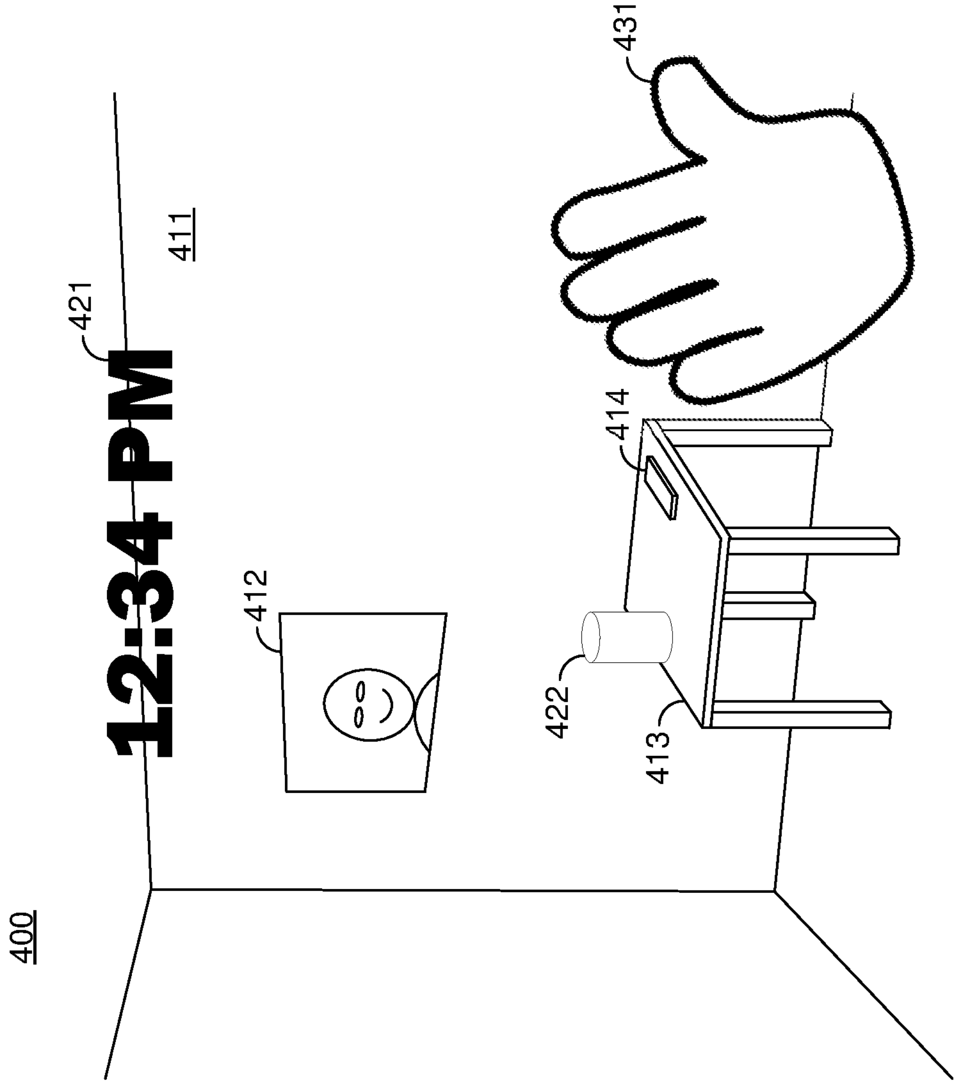

FIG. 4A illustrates the XR environment 400 during a first time period. FIG. 4B illustrates the XR environment 400 during a second time period subsequent to the first time period. During the second time period, as compared to the first display time period, the XR environment 400 includes a right hand 431 of a user of the electronic device.

Figure 4C:
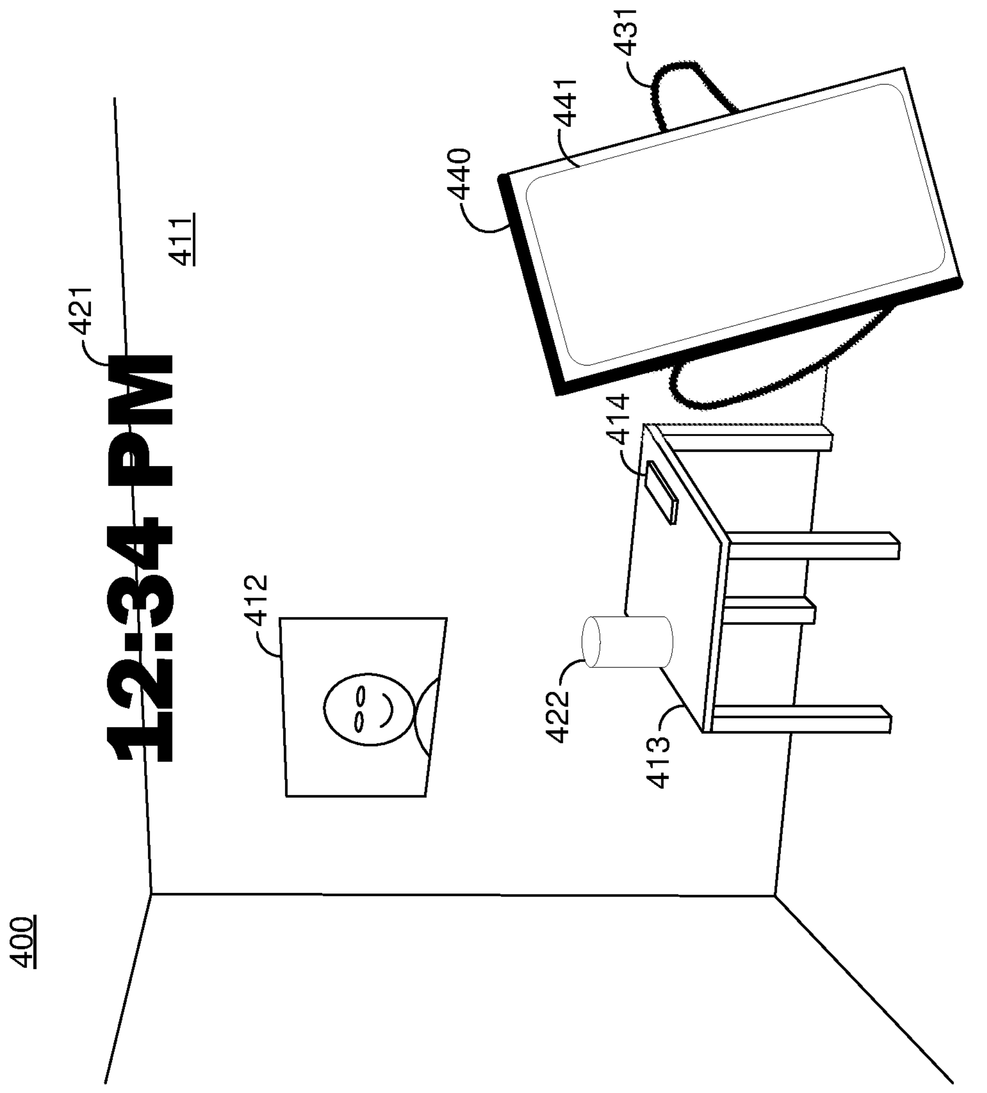

FIG. 4C illustrates the XR environment 400 during a third time period subsequent to the second time period. In response to detecting the right hand 431, the XR environment 400 includes a virtual phone 440 within the right hand 431. The virtual phone 440 is a three-dimensional world-locked virtual object displayed within the right hand 431. The virtual phone 440 includes a virtual screen 441, a flat two-dimensional surface of the virtual phone. In various implementations, the virtual phone 440 is an virtual representation of the real phone 414 with which the user can interact.

Figure 4D:
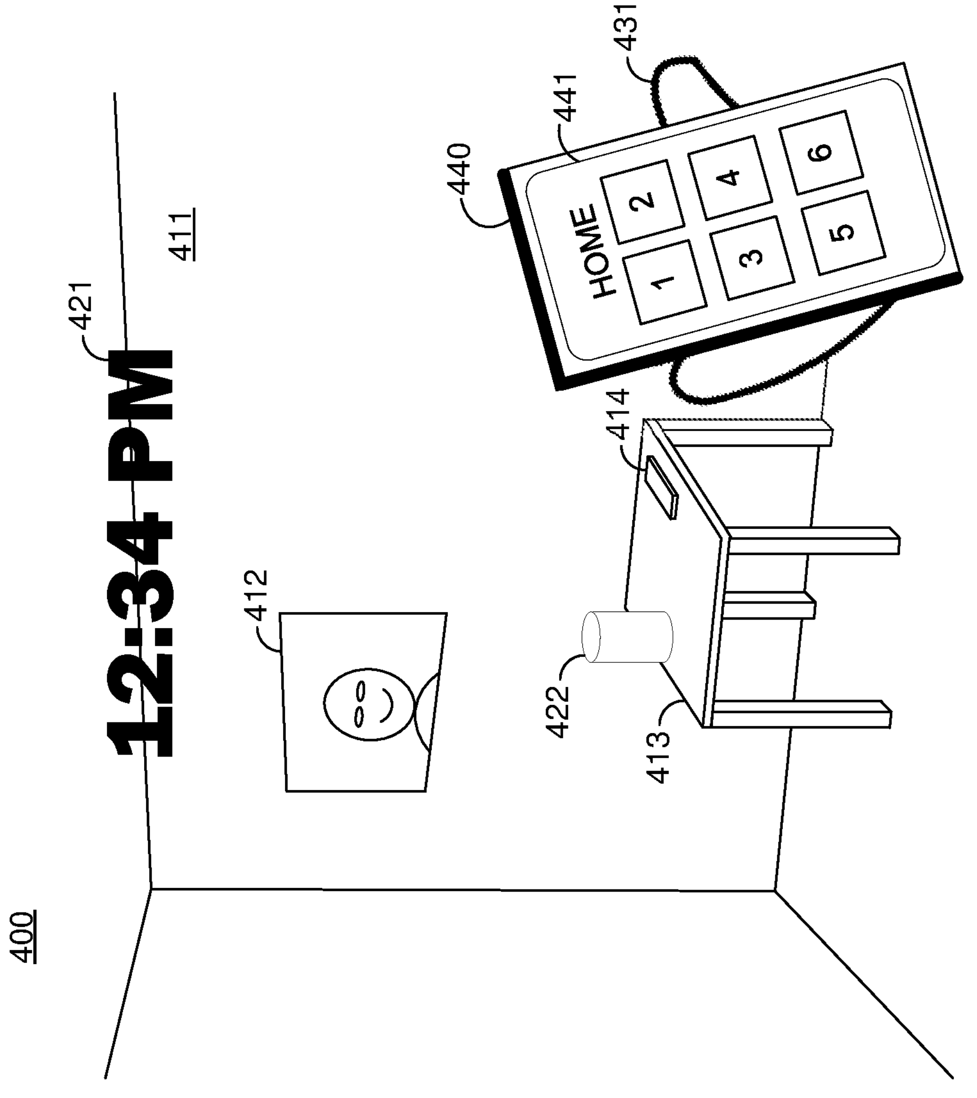

FIG. 4D illustrates the XR environment 400 during a fourth time period subsequent to the third time period. In response to displaying the virtual phone 440, the electronic device determines a pose of the virtual phone 440 (or at least, a pose of the virtual screen 441). In various implementations, the pose indicates a position and/or orientation of the virtual phone 440. The electronic device generates a request for content rendering instructions based on the pose of the virtual phone 440. Based on the content rendering instructions, the electronic device generates a content rendering to be displayed on the virtual screen. In various implementations, the request for the content rendering instructions includes the pose. In various implementations, the request for the content rendering instructions includes a size and/or resolution of the content rendering. For example, in various implementations, when the virtual phone 440 is at a first distance from the user, the content rendering has a first size and a first resolution. When the virtual phone 440 is at a second distance from the user (e.g., further away, the content rendering has a second (smaller) size and second (lower) resolution.

In various implementations, the request for content rendering instructions includes a skewing (or other perspective transform) of the content rendering. For example, in various implementations, when the virtual phone 440 is at a first angle to the user (e.g., facing the user), the content rendering has a first horizontal resolution. When the virtual phone 440 is at a second angle to the user (e.g., rotated about a vertical axis of the virtual phone 440 such that the virtual screen 441 is partially turned away from the user), the content rendering has a second (lower) horizontal resolution.

The electronic device sends the request for the content rendering instructions to another electronic device, such as the phone 414, and receives content rendering instructions from the other electronic device. In various implementations, the content rendering instructions include a content rendering (e.g., an image) to be displayed by the electronic device. In various implementations, the content rendering received from the phone 414 is approximately the size and shape of the virtual screen 441 as displayed by the electronic device (e.g., as determined by the pose of the virtual phone 440).

In various implementations, the content rendering instructions include graphic commands interpretable by the electronic device to generate a content rendering. Further, in various implementations, the electronic device generates a content rendering based on the content rendering instructions.

In various implementations, the graphic commands interpretable by the electronic device to generate the content rendering utilize less bandwidth than would the content rendering. In various implementations, the graphic commands include API (application programming interface) commands. For example, in various implementations, the graphic commands include instructions to create a view, add a button at a particular location in the view, add a text field in a particular location in the view, add text to the text field, add an image at a particular location in the view, etc. In various implementations, the electronic device follows the commands to generate (and populate) the view and performs a perspective transform of the view based on the pose of the virtual phone 440 to generate the content rendering.

Thus, in various implementations, the graphic commands include instructions to add an image to a particular location in the view. Further, the graphic commands include data indicative of the image (e.g., an image file). In various implementations, a size and/or resolution of the image transmitted by the phone 414 is based on the pose of the virtual phone 440. In various implementations, the graphic commands exclude elements of the view that would not be visible in the content rendering.

The electronic device displays the content rendering on the virtual screen 441 of the virtual phone 440. In FIG. 4D, the content rendering displays a home screen with a number of application launching affordances. For example, in various implementations, the electronic device receives graphic commands indicating the location of text reading "HOME" and the location of six buttons. In various implementations, each of the buttons is associated with an image (e.g., an icon) and the size and/or resolution of the images is based on the pose of the virtual phone 440.

Figure 4E:
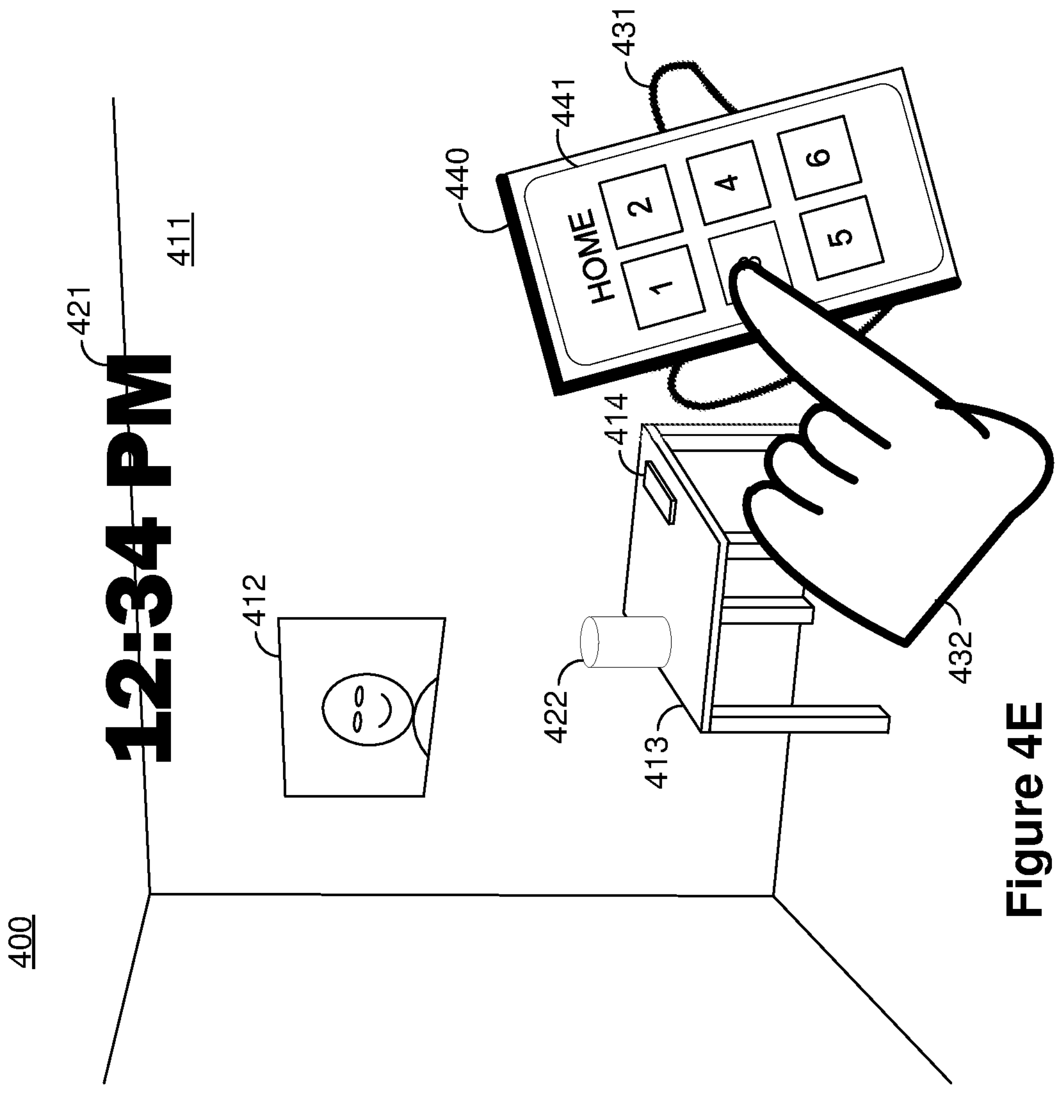

FIG. 4E illustrates the XR environment 400 during a fifth time period subsequent to the fourth time period. During the fifth time period, the XR environment 400 includes a left hand 432 of the user interacting with the virtual screen 441 at a particular location, e.g., the location of a particular one of the application launching affordances. In response to detecting the left hand 432 interacting with the virtual screen 441 at the particular location, the electronic device sends data indicative of the user interaction to the phone 414. In response, the phone 414 generates updated content rendering instructions (based on data received from the application corresponding to the particular application launching affordance) and transmits the updated content rendering instructions to the electronic device.

In various implementations, the electronic device detects the left hand 432 interacting with the virtual screen 441 as a hand gesture event. The hand gesture event indicates a particular hand gesture (e.g., a "tap" performed by extending the pointer finger with the other fingers and thumbs drawn in while the hand moves forward and back) and a particular location in the XR environment 400. The electronic device determines that the location in the XR environment 400 corresponds to a location on the virtual phone 440 and generates a corresponding touch event for the phone 414. The touch event indicates a touch gesture (e.g., a "tap" performed by briefly touching the screen of the phone 414) and a particular location on the phone 414. In various implementations, the data indicative of the user interaction includes the touch event.

Figure 4F:
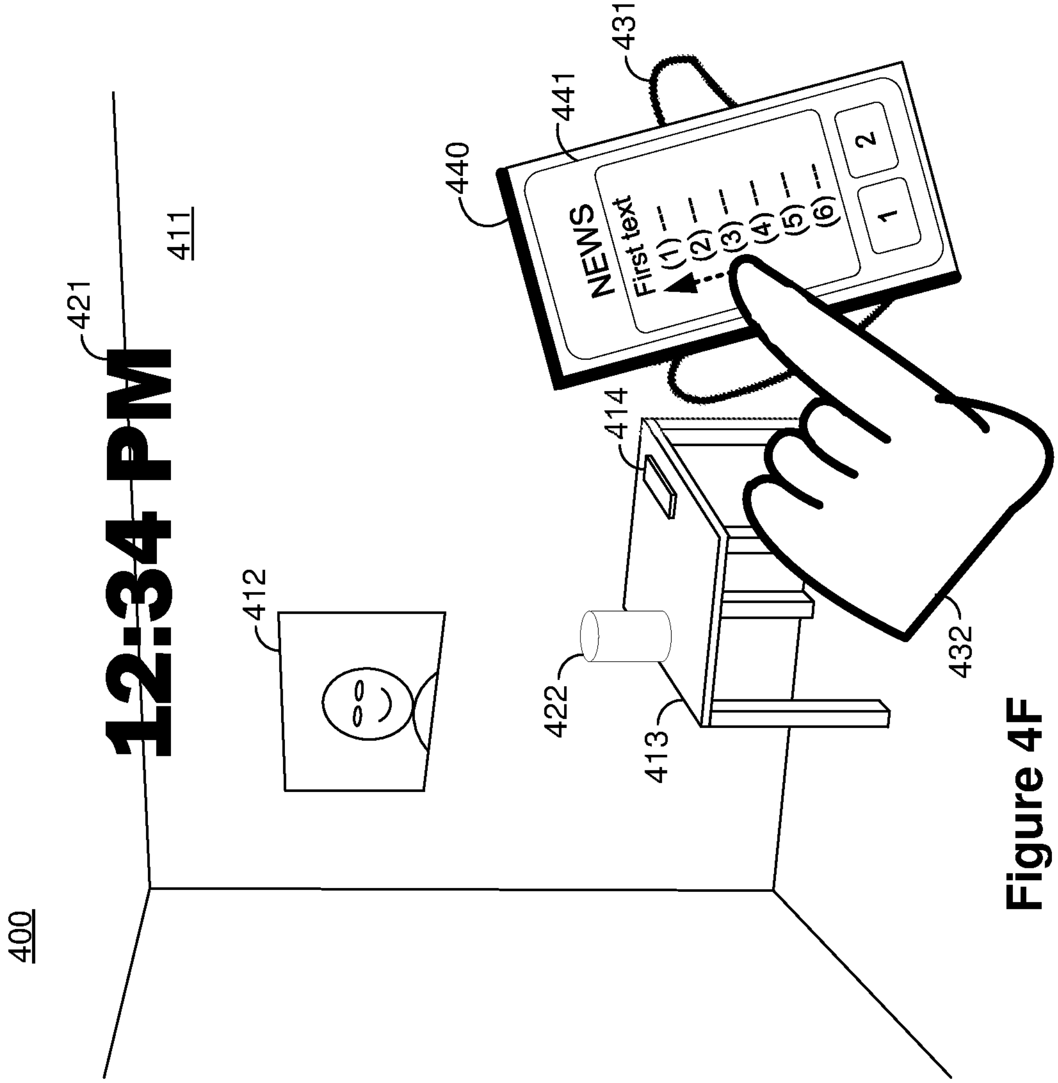

FIG. 4F illustrates the XR environment 400 during a sixth time period subsequent to the fifth time period. During the sixth time period, the virtual screen 441 displays the updated content rendering. In FIG. 4F, the updated content rendering displays a news application. For example, in various implementations, the electronic device receives graphic commands indicating the location of text reading "NEWS", the location of a text field, text to populate the text field beginning with "First text" and listing eight items (of which six are displayed in FIG. 4F) and the location of two buttons. In various implementations, each of the buttons is associated with an image (e.g., an icon) and the size and/or resolution of the images is based on the pose of the virtual phone 440.

During the sixth time period, the XR environment 400 includes the left hand 432 interacting with the virtual screen 441 moving from a particular location within the text field and moving upwards (e.g., so as to scroll the text field).

In various implementations, in response to detecting the left hand 432 interacting with the virtual screen 441 moving from the particular location and moving upwards, the electronic device sends data indicative of the user interaction to the phone 414. In response, the phone 414 generates updated content rendering instructions (based on data received from the application corresponding to the particular application launching affordance) and transmits the updated content rendering instructions to the electronic device.

As an example, in various implementations, the electronic device detects the left hand 432 interacting with the virtual screen 441 as a hand gesture event. The hand gesture event indicates a particular hand gesture (e.g., a "swipe" performed by extending the pointer finger with the other fingers and thumbs drawn in while the hand moves from a first location to a second location) and a particular location in the XR environment 400. The electronic device determines that the location in the XR environment 400 corresponds to a location on the virtual phone 440 and generates a corresponding touch event for the phone 414. The touch event indicates a touch gesture (e.g., a "swipe" performed by moving a contact along a screen of the phone 414) and a particular location on the phone 414.

However, in various implementations, the electronic device generates an updated content rendering without sending data indicative of the user interaction to the phone 414. For example, as the electronic device previously received the text beginning with "First text" and listing eight items, in response to the hand gesture event, the electronic device scrolls the text field without transmitting data indicative of the user interaction to the phone 414.

Figure 4G:
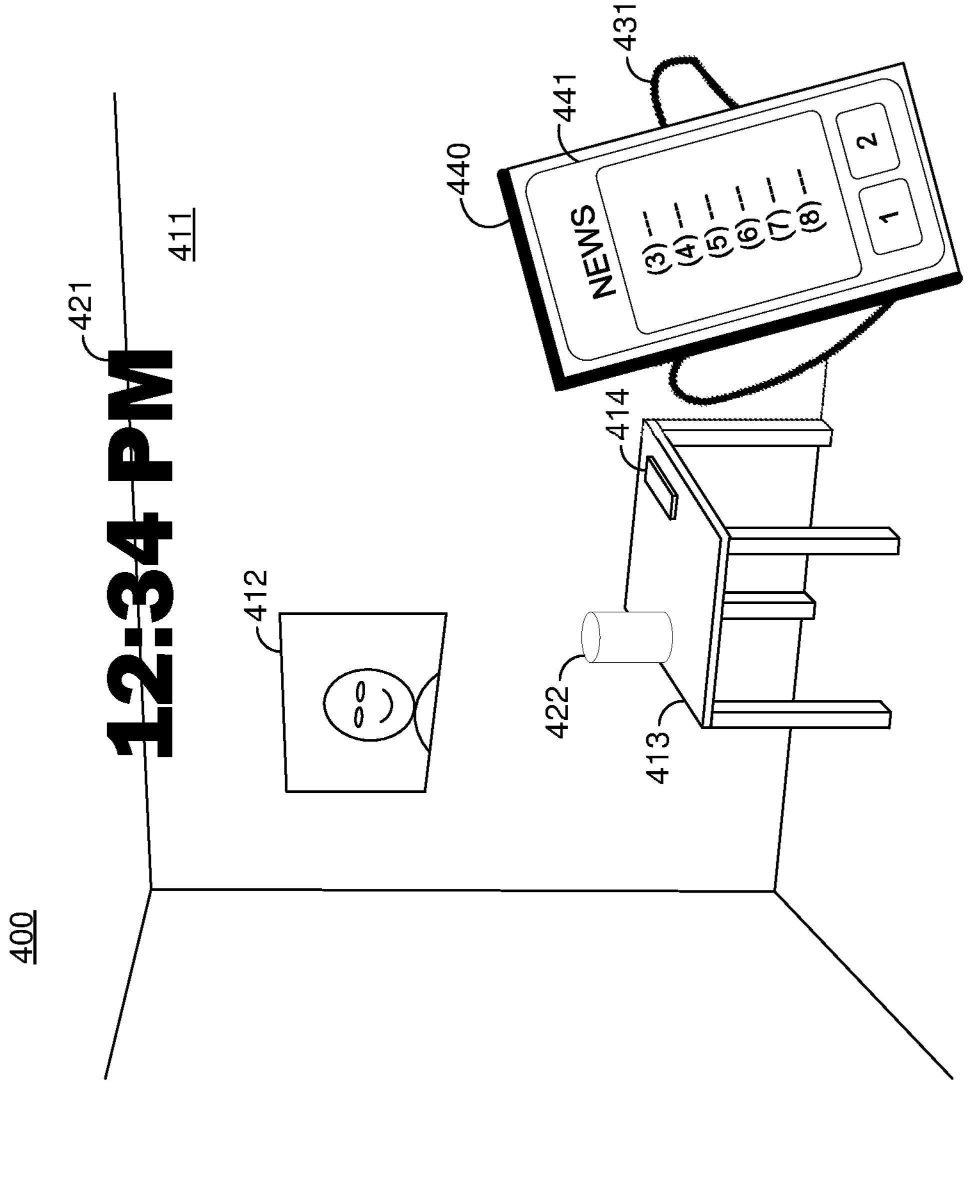

FIG. 4G illustrates the XR environment 400 during a seventh time period subsequent to the sixth time period. During the seventh time period, the virtual screen 441 displays the updated content rendering in which the text field displays items (3)—(8).

Figure 4H:
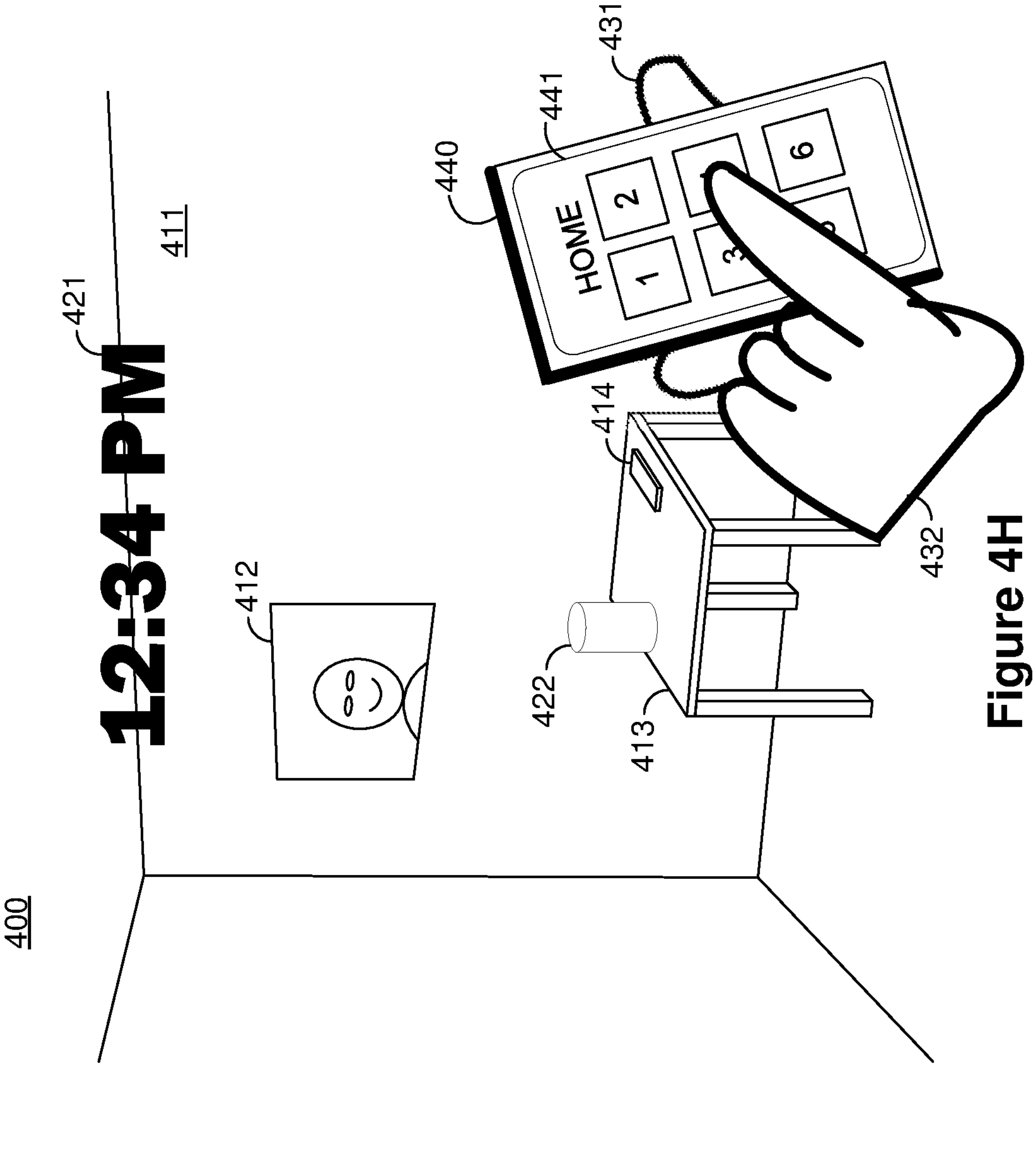

FIG. 4H illustrates the XR environment 400 during an eighth time period subsequent to the seventh time period. During the eighth time period, the virtual screen 441 displays the home screen (as previously illustrated in FIG. 4D). During the eighth time period, the XR environment 400 includes the left hand 432 of the user interacting with the virtual screen 441 at a particular location, e.g., the location of a different one of the application launching affordances. In response to detecting the left hand 432 interacting with the virtual screen 441 at the particular location, the electronic device sends data indicative of the user interaction to the phone 414. In response, the phone 414 generates updated content rendering instructions (based on data received from the application corresponding to the particular application launching affordance) and transmits the updated content rendering instructions to the electronic device.

Figure 4I:
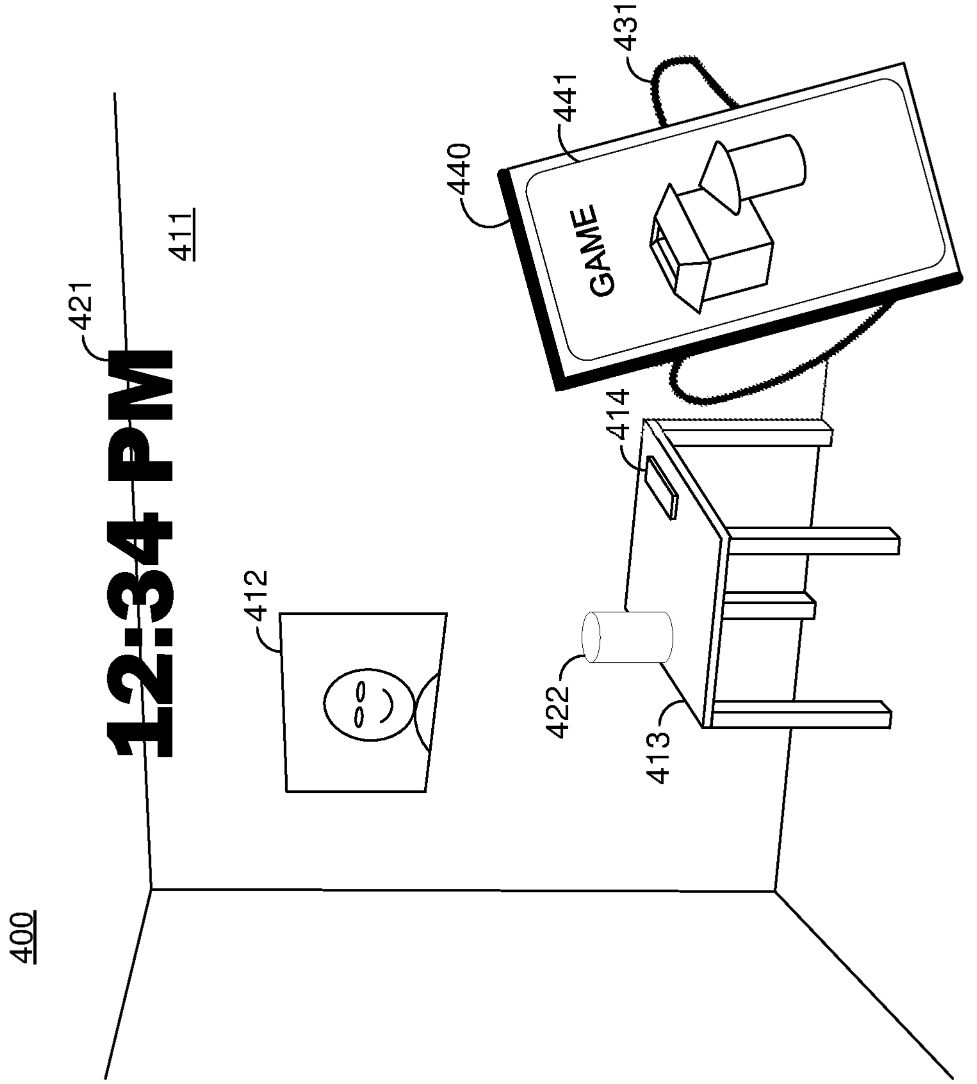

FIG. 4I illustrates the XR environment 400 during a ninth time period subsequent to the eighth time period. During the ninth time period, the virtual screen 441 displays the updated content rendering. In FIG. 4I, the updated content rendering displays a game application. For example, in various implementations, the electronic device receives graphic commands indicating an image. In various implementations, the size and/or resolution of the image is based on the pose of the virtual phone 440. In various implementations, the image is the size and shape of the virtual screen 441 (e.g., based on the pose of the virtual phone 440).

Figure 4J:
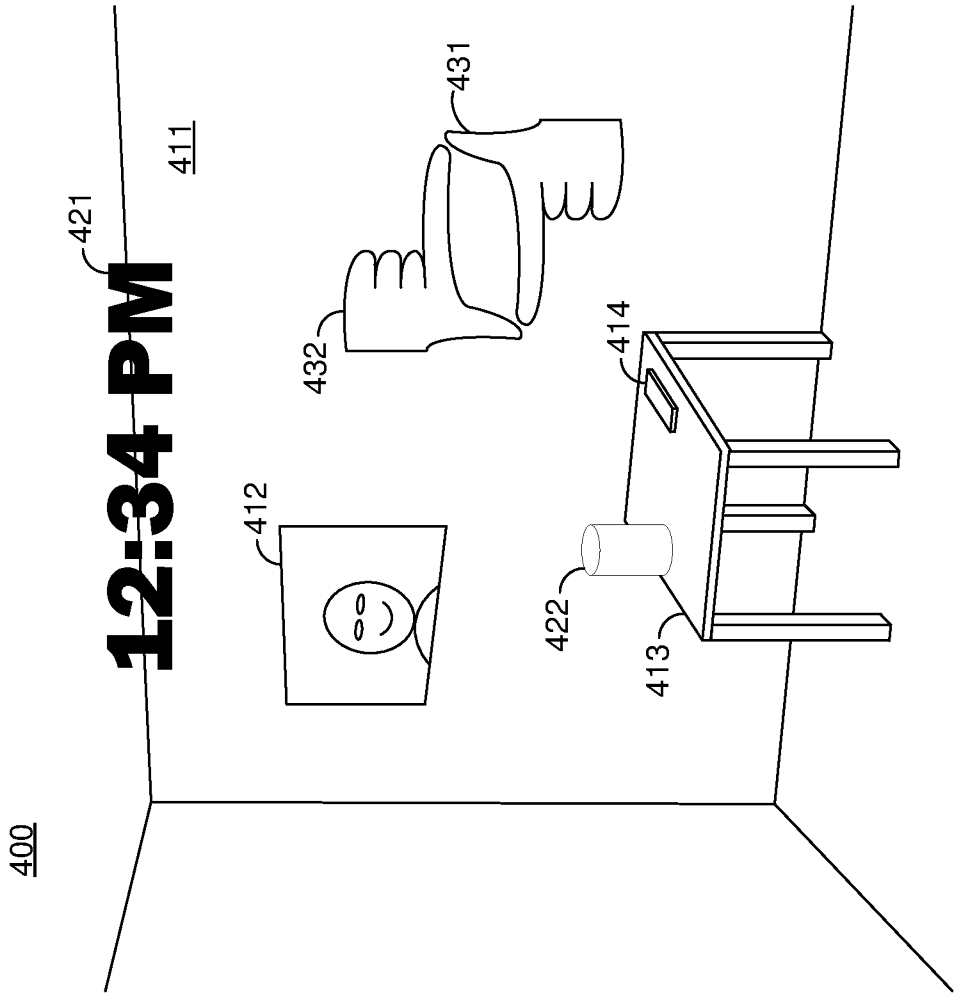

FIG. 4J illustrates the XR environment 400 during a tenth time period subsequent to the ninth time period. During the tenth time period, the XR environment 400 includes the left hand 432 and right hand 431 in a framing gesture and the virtual phone 440 is no longer present in the XR environment 400.

Figure 4K:
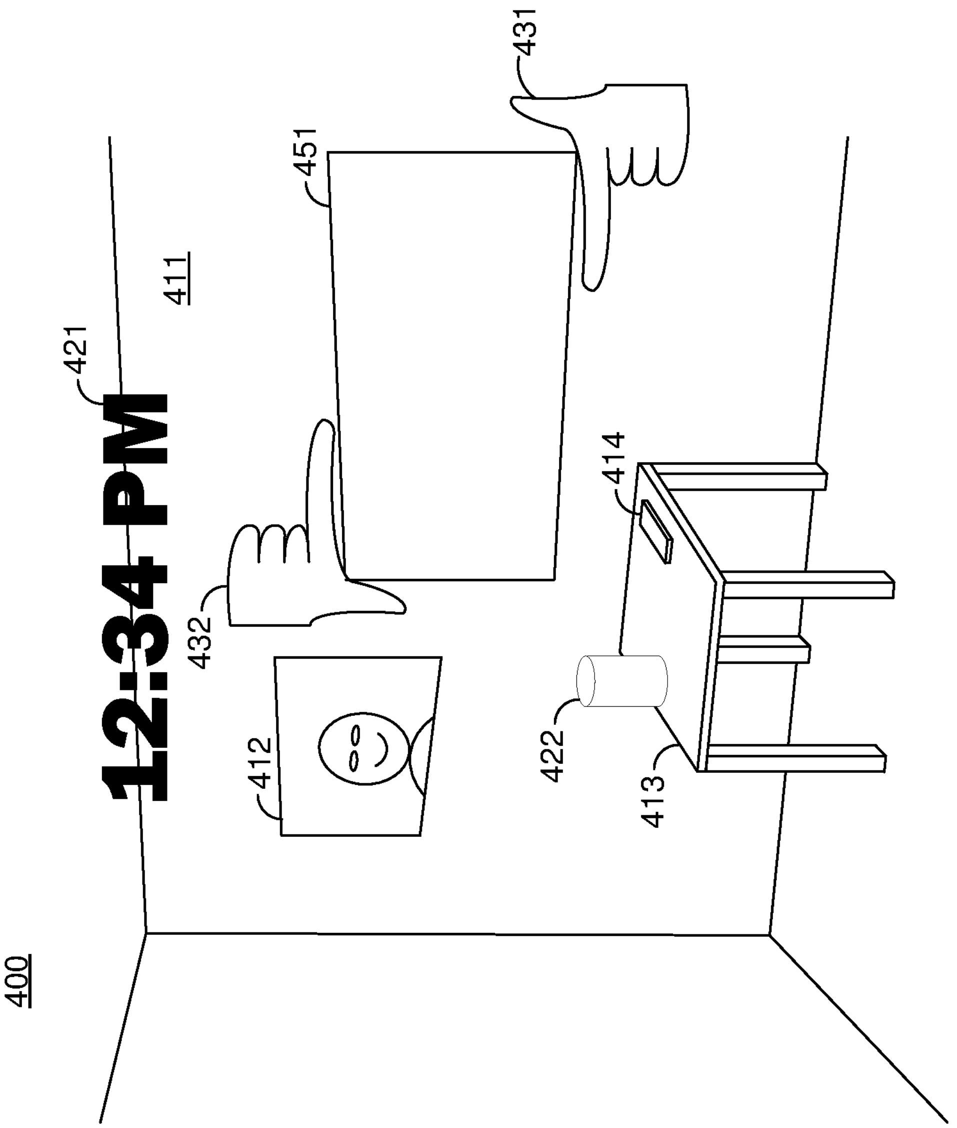

FIG. 4K illustrates the XR environment 400 during an eleventh time period subsequent to the tenth time period. During the eleventh time period, the left hand 432 and right hand 431 have moved away from each other along a diagonal path. In response to such motion, the XR environment 400 includes a virtual tile 451. The virtual tile 451 is a two-dimensional world-locked virtual object displayed on the wall 411.

Figure 4L:
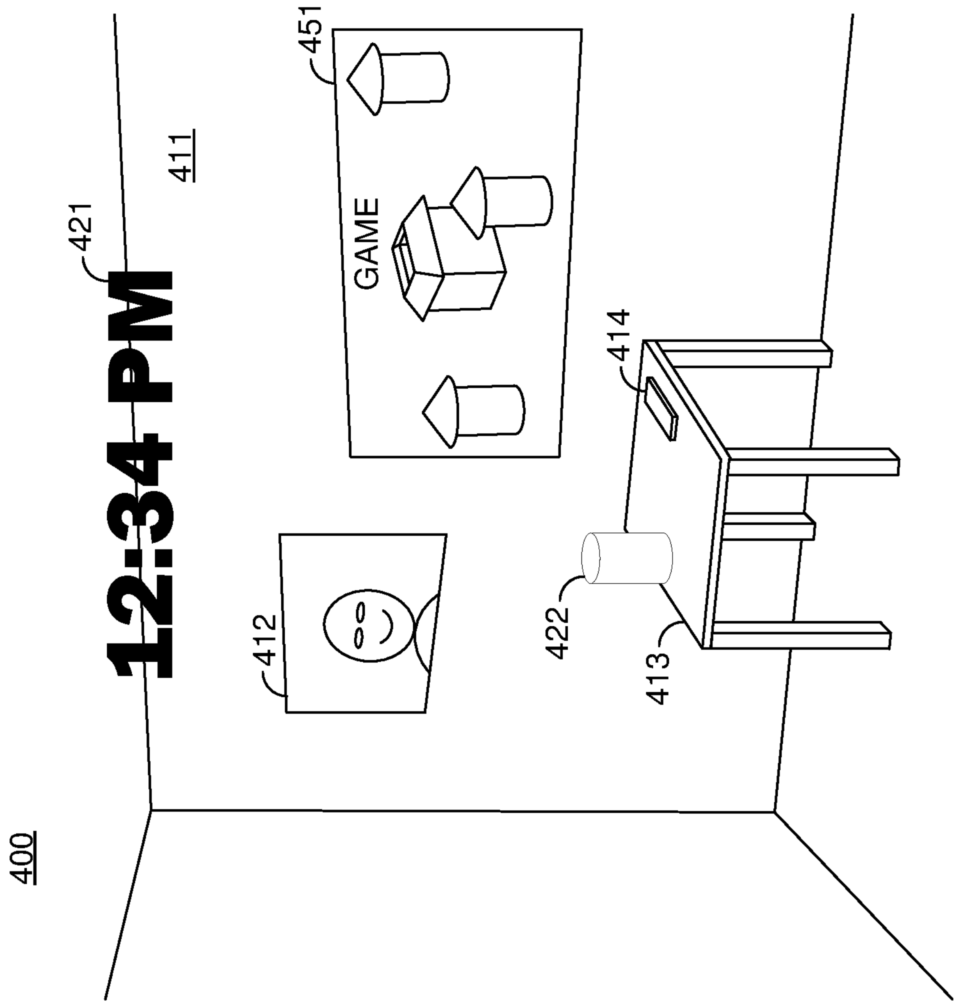

FIG. 4L illustrates the XR environment 400 during a twelfth time period subsequent to the eleventh time period. In response to displaying the virtual tile 451, the electronic device determines a pose of the virtual tile 451. In various implementations, the pose indicates a position and/or orientation of the virtual tile 451. The electronic device generates a request for content rendering instructions based on the pose of the virtual tile 451.

The electronic device sends the request for the content rendering instructions to the phone 414 and receives content rendering instructions. Further, in various implementations, the electronic device generates a content rendering based on the content rendering instructions and displays the content rendering on the virtual tile 451. In FIG. 4L, the content rendering displays the game application.

In various implementations, the request for the content rendering instructions includes an indication of a landscape mode or a portrait mode. Accordingly, in various implementations, the content rendering instructions are generated, by the phone 414, based on a landscape mode or a portrait mode. Thus, in FIG. 4L, the content rendering displayed on the virtual tile 451 (rendered in a landscape mode) includes content not displayed on the virtual screen 441 (rendered in a portrait mode) in FIG. 4I.

Figure 5:
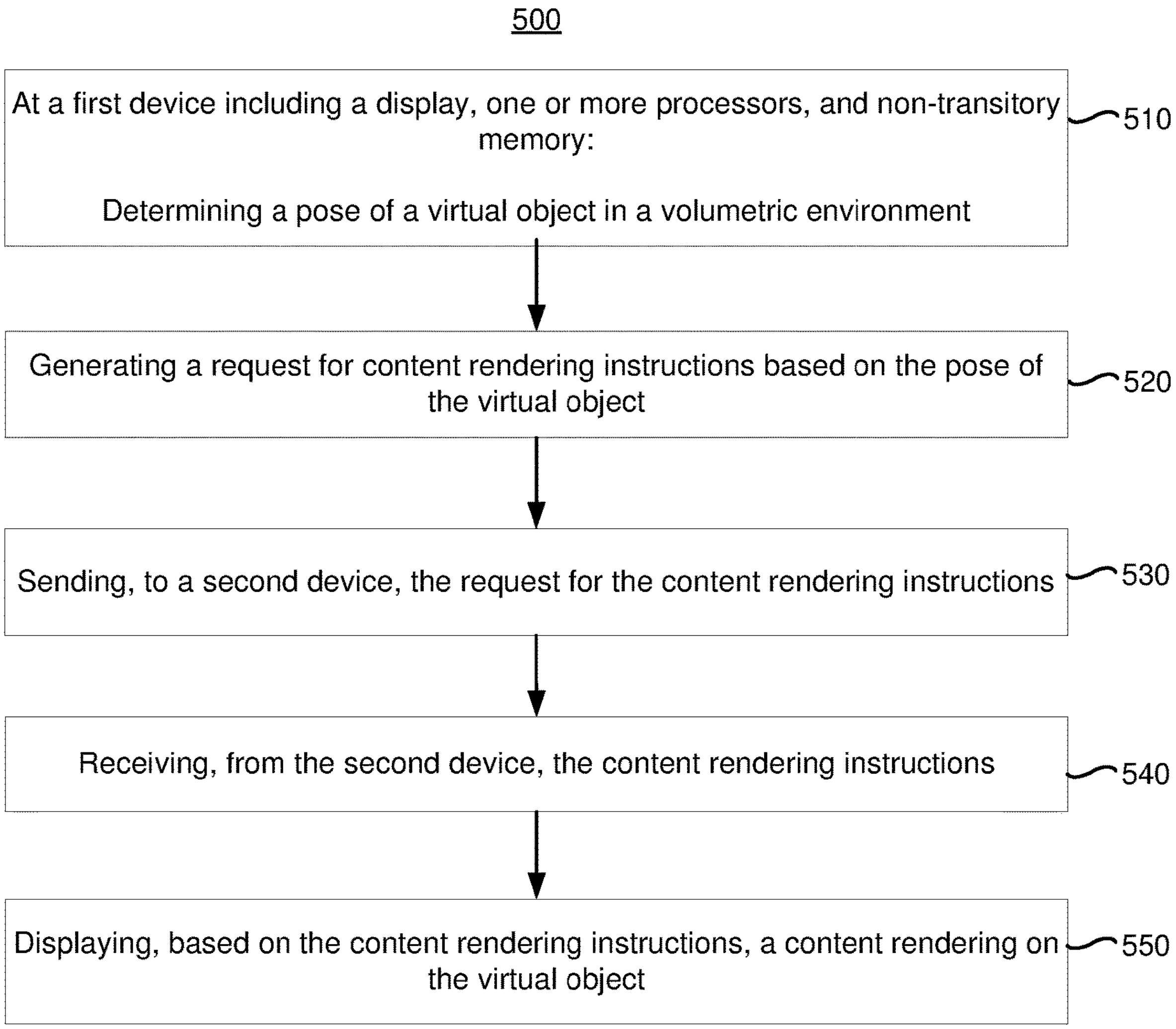
FIG. 5 is a flowchart representation of a method of distributed content rendering in accordance with some implementations.

FIG. 5 is a flowchart representation of a method 500 of distributed content rendering in accordance with some implementations. In various implementations, the method 500 is performed by a first device including a display, one or more processors, and non-transitory memory (e.g., the electronic device 120 of FIG. 3). In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

The method 500 begins, in block 510, with the device determining a pose of a virtual object in a volumetric environment. In various implementations, determining the pose of the virtual object includes determining a position of the virtual object in the volumetric environment (e.g., three-dimensional coordinates of the virtual object in the volumetric environment). In various implementations, determining the pose of the virtual object includes determining an orientation of the virtual object in the volumetric environment.

In various implementations, the virtual object includes a flat two-dimensional surface. For example, in FIG. 4C, the virtual phone 440 includes a virtual screen 441, which is a flat two-dimensional surface. As another example, in FIG. 4K, the virtual tile 451 is a flat two-dimensional surface. In various implementations, the flat two-dimensional surface is rectangular. For example, in FIG. 4K, the virtual tile 451 is rectangular. In various implementations, the virtual object is a two-dimensional virtual object. For example, in FIG. 4K, the virtual tile 451 is a two-dimensional virtual object. In various implementations, the virtual object is a three-dimensional virtual object. For example, in FIG. 4C, the virtual phone 440 is a three-dimensional virtual object. In various implementations, the virtual object is a virtual electronic device, such as a virtual phone. For example, in FIG. 4C, the virtual phone 440 is a virtual electronic device.

In various implementations, the method 500 includes displaying the virtual object. In particular, in various implementations, the method 500 includes displaying the virtual object in response to a trigger. In various implementations, the trigger is a hand gesture (e.g., detecting a hand gesture event). For example, in FIG. 4C, the virtual phone 440 is displayed in response to detecting the right hand 431 of the user. In particular, in various implementations, the virtual phone 440 is displayed in response to detecting the open right hand 431 of the user with the palm facing the user. As another example, in FIG. 4K, the virtual tile 451 is displayed in response to detecting the left hand 432 and right hand 431 in a framing gesture, moving away from each other along a diagonal path.

In various implementations, the virtual object is invisible, e.g., not displayed. For example, in FIG. 4K, the virtual tile 451 is hidden, e.g., completely occluded by the content rendering.

The method 500 continues, in block 520, with the device generating a request for content rendering instructions based on the pose of the virtual object. In various implementations, the request for the content rendering instructions indicates the pose of the virtual object. In various implementations, the request for the content rendering instructions indicates a size of the content rendering. In various implementations, the request for the content rendering indicates a resolution of the content rendering. In various implementations, the request for the content rendering indicates a shape of the content rendering. For example, in various implementations, the request for the content rendering indicates a skewing, an affine transform, or a perspective transform of the content rendering. In various implementations, the request for the content rendering instructions indicates a landscape mode or a portrait mode.

The method 500 continues, in block 530, with the device sending, to a second device, the request for the content rendering instructions. In response to receiving the request for the content rendering, the second device generates the content rendering instructions based on the request for the content rendering instructions.

The method 500 continues, in block 540, with the device receiving, from the second device, the content rendering instructions. In various implementations, the content rendering instructions include graphic commands Thus, in various implementations, the method 500 includes generating a view based on the graphic commands and generating a content rendering based on the view and the pose of the virtual object.

In various implementations, the content rendering instructions include an image. In various implementations, a size and/or resolution of the image is based on the pose of the virtual object. In various implementations, the image is a size and shape of the virtual object. In various implementations, the image includes a matrix of pixels, wherein the matrix of pixels includes a parallelogram-shaped or trapezoid-shaped region of the matrix having RGB values and a transparency value of opaque and the remainder of the pixels have a transparency value indicating that the region is transparent.

In various implementations, the method 500 includes transforming the image based on the pose of the virtual object, e.g., such that the transformed image is the size and shape of the virtual object.

The method 500 continues, in block 550, with the device displaying, based on the content rendering instructions, the content rendering on the virtual object. In various implementations, displaying the content rendering on the virtual object includes generating, based on the content rendering instructions, the content rendering.

In various implementations, displaying the content rendering on the virtual object includes displaying the content rendering on a flat two-dimensional surface of the virtual object. In various implementations, the size and shape of the content rendering is approximately equal to the size and shape of the flat two-dimensional surface displayed by the device. Thus, in various implementations, displaying the content rendering includes hiding the virtual object. For example, in FIG. 4K, the virtual tile 451 is hidden (e.g., completely covered) by the content rendering.

In various implementations, the method 500 further includes detecting a user input, such as a user input interacting with the virtual object. For example, in FIG. 4E, the electronic device detects the left hand 432 interacting with the virtual phone 440. The method 500 includes sending, to the second device, data indicative of the user input and receiving, from the second device, updated content rendering instructions based on the data indicative of the user input. For example, in FIG. 4F, the virtual phone 440 displays an updated content rendering based on the user input interacting with the virtual phone 440.

In various implementations, detecting the user input includes detecting a hand gesture event. In various implementations, the method 500 includes mapping the hand gesture event to a touch gesture event. In various implementations, sending the data indicative of the user input includes sending the touch gesture event.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms “first,” “second,” etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a first device including a display, one or more processors, and a memory:

determining a pose of a virtual object in a volumetric environment;

generating a request for content rendering instructions based on the pose of the virtual object;

wirelessly sending, to a second device separate from the first device, the request for the content rendering instructions;

wirelessly receiving, from the second device, the content rendering instructions;

displaying, based on the content rendering instructions, a content rendering of the virtual object;

detecting a hand gesture event;

mapping the hand gesture event to a touch gesture event;

wirelessly sending, to the second device, data indicative of the touch gesture event; and wirelessly receiving, from the second device, updated content rendering instructions based on the data indicative of the touch gesture event.

2. The method of claim 1, wherein the virtual object includes a flat two-dimensional surface, wherein displaying the content rendering on the virtual object includes displaying the content rendering on the flat two-dimensional surface.

3. The method of claim 1, wherein the request for the content rendering instructions indicates a perspective transform.

4. The method of claim 3, wherein the request for the content rendering instructions indicates an affine transform.

5. The method of claim 1, wherein the request for the content rendering instructions indicates a size and/or shape of the content rendering.

6. The method of claim 1, wherein the request for the content rendering instructions indicates a resolution of the content rendering.

7. The method of claim 1, wherein the request for the content rendering instructions indicates a landscape mode or a portrait mode.

8. The method of claim 1, further comprising generating the content rendering based on the content rendering instructions.

9. The method of claim 8, wherein generating the content rendering includes transforming an image based on the pose.

10. The method of claim 9, wherein the content rendering instructions include the image.

11. The method of claim 9, wherein the content rendering instructions include graphic commands and generating the content rendering includes generating the image based on the graphic commands.

12. The method of claim 1, further comprising displaying, based on the updated content rendering instructions, an updated content rendering on the virtual object.

13. A first device comprising:

a display;

non-transitory memory; and one or more processors to:

determine a pose of a virtual object in a volumetric environment;

generate a request for content rendering instructions based on the pose of the virtual object;

wirelessly send, to a second device separate from the first device, the request for the content rendering instructions;

wirelessly receive, from the second device, the content rendering instructions;

display, based on the content rendering instructions, a content rendering on the virtual object;

detect a hand gesture event;

map the hand gesture event to a touch gesture event;

wirelessly send, to the second device, data indicative of the touch gesture event; and wirelessly receive, from the second device, updated content rendering instructions based on the data indicative of the touch gesture event.

14. The first device of claim 13, wherein the virtual object includes a flat two-dimensional surface, wherein displaying the content rendering on the virtual object includes displaying the content rendering on the flat two-dimensional surface.

15. The first device of claim 13, wherein the request for the content rendering instructions indicates a perspective transform.

16. The first device of claim 13, wherein the request for the content rendering instructions indicates a size, shape, and/or resolution of the content rendering.

17. The first device of claim 13, wherein the one or more processors are further to display, based on the updated content rendering instructions, an updated content rendering on the virtual object.

18. The first device of claim 13, wherein the one or more processors are further to generate the content rendering based on the content rendering instructions.

19. A non-transitory memory storing one or more programs, which, when executed by one or more processors of a first device including a display, cause the first device to:

determine a pose of a virtual object in a volumetric environment;

generate a request for content rendering instructions based on the pose of the virtual object;

wirelessly send, to a second device separate from the first device, the request for the content rendering instructions;

wirelessly receive, from the second device, the content rendering instructions;

display, based on the content rendering instructions, a content rendering on the virtual object;

detect a hand gesture event;

map the hand gesture event to a touch gesture event;

wirelessly send, to the second device, data indicative of the touch gesture event; and wirelessly receive, from the second device, updated content rendering instructions based on the data indicative of the touch gesture event.

* * * * *